April 11, 1939. J. G. JACKSON 2,153,757
STAY FOR PAN SETS
Original Filed Feb. 23, 1937

INVENTOR.
Joseph G. Jackson
BY
ATTORNEY.

Patented Apr. 11, 1939

2,153,757

UNITED STATES PATENT OFFICE 2,153,757

STAY FOR PAN SETS

Joseph G. Jackson, Oak Park, Ill., assignor to The Edward Katzinger Company, Chicago, Ill., a corporation of Illinois Original application February 23, 1937, Serial No. 127,329. Divided and this application March 21, 1938, Serial No. 197,232

5 Claims. (Cl. 53—6)

This application is a division of copending application Serial No. 127,329, filed February 23, 1937, and the invention forming the subject hereof relates to stays to be interposed between the pans of a baking pan set and has for its object the permanent mounting of the stay between the pans of the set and the overcoming of any tendency of the stay to become loosened or to move relatively to the pans with which it cooperates.

With the above and other objects in view, as will be apparent, this invention consists in the construction, combination and arrangement of parts, all as hereinafter more fully described, claimed and illustrated in the accompanying drawing, wherein:

Figure 1:
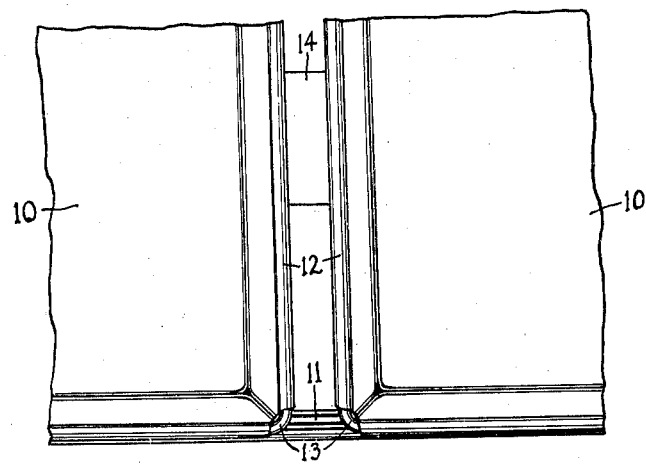
Fig. 1 is a fragmentary plan view of a pan set disclosing the present stay in position and coacting with the adjoining walls of adjacent pans of the set.
Figure 2:
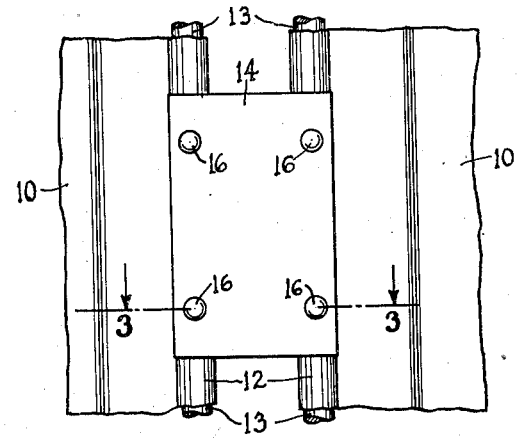
Fig. 2 is an enlarged fragmentary bottom plan view of the present stay and its mounting.

Baking pan sets, consisting of a plurality of individual baking pans secured together in spaced, parallel relationship, usually embody stays or braces interposed between the adjoining walls of adjacent pans. These stays brace the walls of the pans with which they coact and maintain the alignment of the walls, prevent the bulging or bending of the walls under the pressure of the pan contents and generally strengthen and rigidify the set.

It has been found that the stays employed heretofore frequently loosen, sometimes becoming entirely disengaged from the coacting pan walls, and often move longitudinally relative to the pans.

The present invention contemplates a brace or stay which, when once set in place between the adjoining walls of adjacent pans, is a permanent part of the pan set structure, cannot become loosened or be disengaged from the coacting pans, and is incapable of moving longitudinally with reference to the pans of the set.

Reference being had more particularly to the drawing, 10 indicates a plurality of baking pans of any suitable shape, construction or form, positioned in spaced parallel relationship and incorporated into a set in any desired manner, preferably by a rectangular frame 11 surrounding the entire group of pans 10, and resting flush against and secured to the exposed walls thereof in any suitable manner. Since the particular construction of the several pans of the set and the means by which they are combined into a set, forms no part of the present invention, it is unnecessary to more particularly describe the same. It is sufficient to point out that the present stay can readily be applied to practically all types of pans and pan set constructions.

Figure 3:
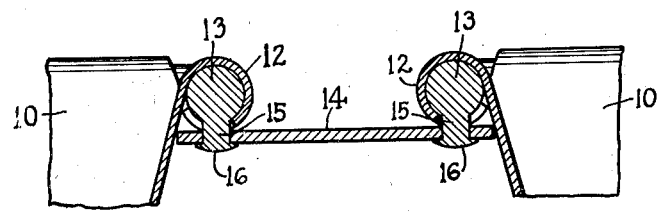
Fig. 3 is a transverse section taken through the stay along line 3—3 of Fig. 2 to illustrate the mounting thereof and its cooperation with the pan elements.

At the edges of the walls of the pans 10 are the flanges 12 which are usually bent downwardly about and substantially around the wires 13 lying against the pan walls adjoining their edges as shown in Fig. 3.

The stay comprises a relatively flat body 14 which is held against the underside of the pan flanges 12 by means of a series of studs 15 extended, swaged from or otherwise provided on each wire 13 in alignment with the body 14 of the stay. These studs extend downwardly in a vertical plane and pass and project through the end portions of the body of the stay near the ends thereof. The projecting ends of the studs 15 below the bottom surface of the body 14 of the stay, are headed or upset, as at 16, to firmly and rigidly attach the stay 14 to the wires 13.

It is apparent that the studs 15 permanently and fixedly secure the stay 14 to the wires 13 and that the stay is entirely incapable of becoming loosened or of moving relatively to the pans. Furthermore, the studs 15 in passing through the flanges 12 of the pan walls, as shown in the drawing, function to prevent the flanges from becoming disengaged or unwrapped from the cooperating wires.

What is claimed is:

1. The combination with a pair of spaced pans, each having a bead containing a wire on the adjoining walls thereof, of a stay interposed between said pans, and studs projecting from the wires in said beads to pass through the stay.

2. The combination with a pair of spaced pans, each having a bead containing a wire on the adjoining walls thereof, of a stay interposed between said pans, and studs projecting from the wires of the beads to pass through the stays and provided with heads resting against the surface of the stays.

3. The combination with a pair of spaced pans, each having a bead containing a wire on the adjoining walls thereof, of a stay interposed between said pans, and a series of studs formed integrally with each of the wires within the beads, projecting downwardly from the wires to pass through the end portions of the stay and be upset against the opposite face thereof to said wires.

4. The combination with a pair of spaced pans, of flanges on the adjoining walls thereof, wires wrapped in said flanges to form outstanding beads, a stay interposed between said pans, and a series of studs integral with and projecting from said wire to pass through said flanges and stay.

5. The combination with a pair of spaced pans, of flanges on the adjoining walls thereof, wires wrapped in said flanges to form outstanding beads, a stay interposed between said pans, and a series of studs formed integrally with and projecting downwardly from said wires to pass through the flanges and the end portions of the stay and be upset against the face of the stay opposed to said wires.

JOSEPH G. JACKSON.